109. SAFES, BANK PROTECTION AND RELATED DEVICES.
Sept. 2, 1924.
C. F. TANNEHILL
1,506,791
BANK PROTECTING STRUCTURE
Filed Sept. 16, 1922   2 Sheets-Sheet 2
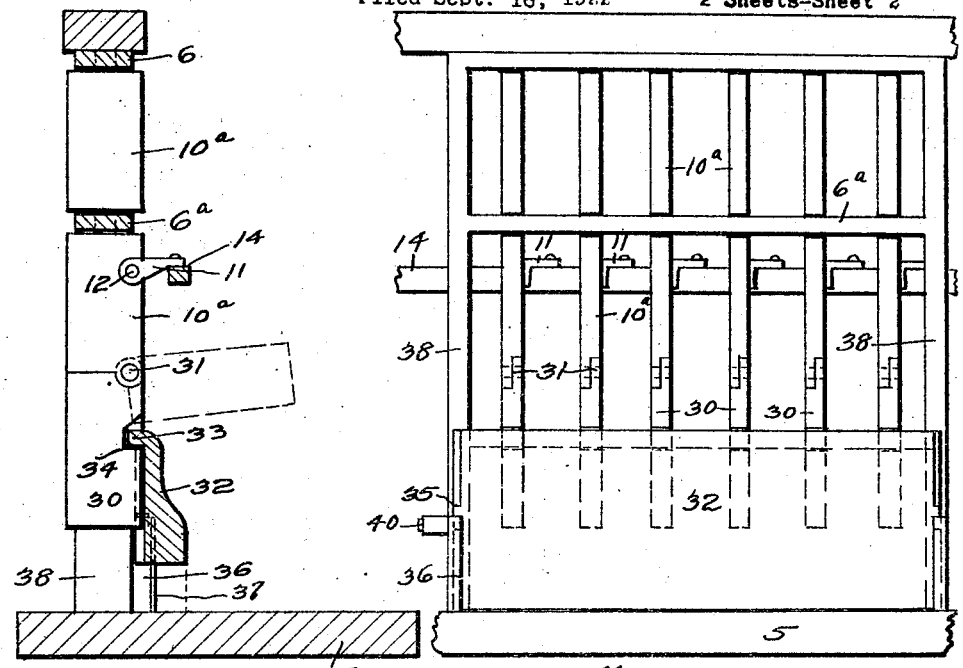
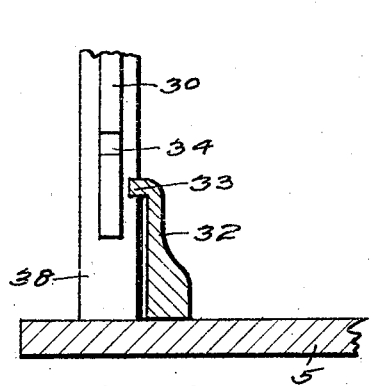
Inventor
C. F. Tannehill,
By Shepherd Campbell
Attorney

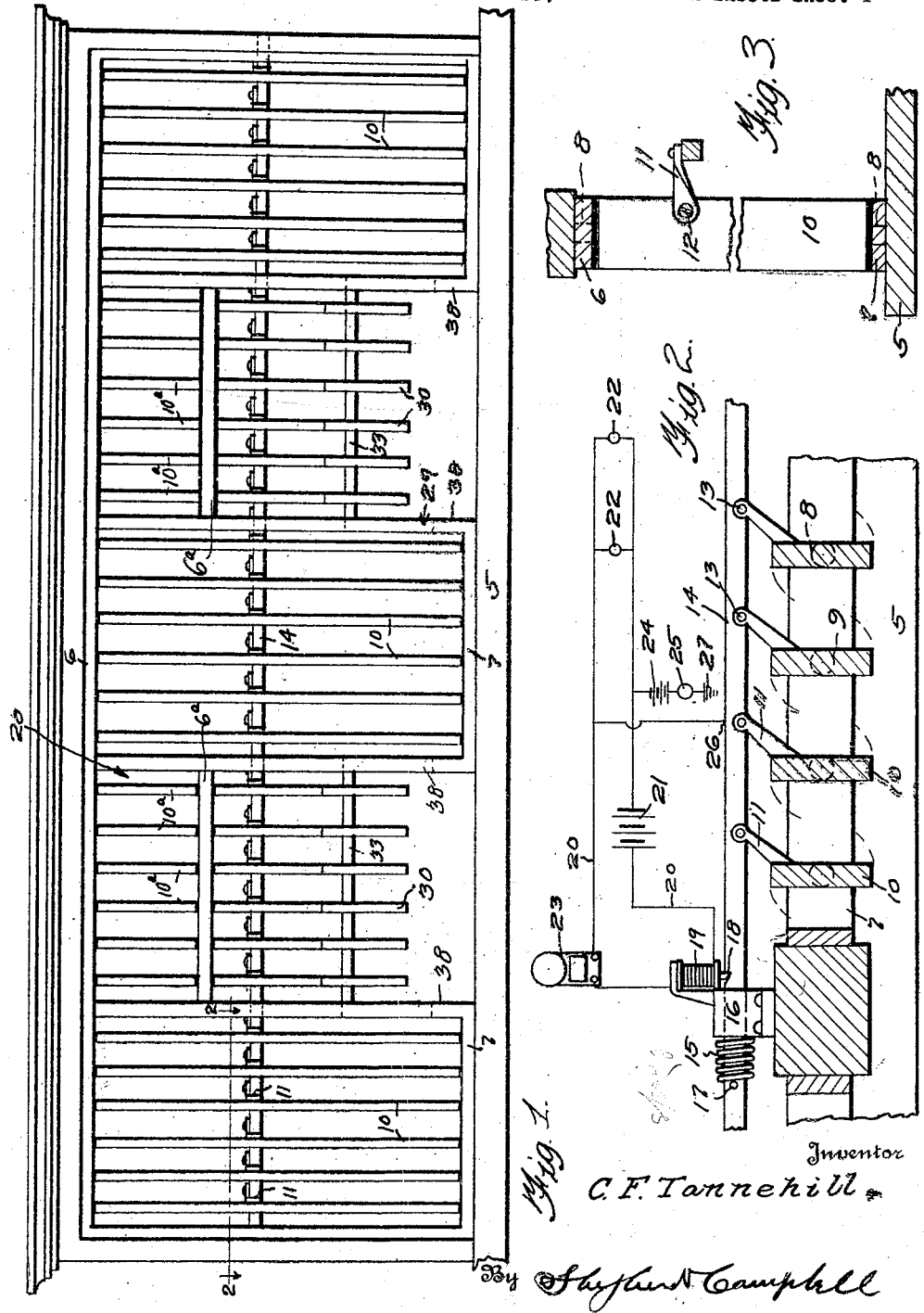

Patented Sept. 2, 1924.

1,506,791

UNITED STATES PATENT OFFICE.

CHARLES FRANKLIN TANNEHILL, OF GIRARD, KANSAS.

BANK-PROTECTING STRUCTURE.

Application filed September 16, 1922. Serial No. 588,714.

*To all whom it may concern:*

Be it known that I, CHARLES F. TANNEHILL, a citizen of the United States, residing at Girard, in the county of Crawford and State of Kansas, have invented certain new and useful Improvements in Bank-Protecting Structures, of which the following is a specification, reference being had therein to the accompanying drawings.

This invention relates to a bank protecting structure and it has for its object to provide a bullet proof grill the members of which are adapted to move after the manner of a Venetian blind, i. e. to oscillate about pivots in such manner that when moved to one position they lie in the same plane and form a blank wall and when moved to another position they lie in parallelism with but in spaced relation to each other to thereby form an open grill through which business may be transacted.

It is a further object of the invention to provide a special construction of members constituting the windows in the grill by means of which the usual openings at the lower portions of said windows will be automatically closed when the remainder of the grill is closed.

It is a further object of the invention to provide in a structure of the character indicated, electrical controlling means, operable from a plurality of points in the bank and the actuation of any one of which will close the grill and sound an alarm which alarm may be located either in the bank or on the street adjacent the bank or at a distant point such as police headquarters.

It is also contemplated to completely electrify the metal grill when the members thereof move to closed position by the actuation of said electrical controlling means.

Further objects and advantages of the invention will be set forth in the detailed description which follows.

In the accompanying drawing:

Fig. 1 is a front elevation of a grill constructed in accordance with the invention.

Fig. 2 is a horizontal sectional view therethrough on line 2—2 of Fig. 1.

Fig. 3 is a fragmentary vertical sectional view.

Fig. 4 is a vertical sectional view through one of the windows of the grill.

Fig. 5 is a rear elevation of the members constituting the window.

Fig. 6 is a horizontal sectional view through the members constituting the window; and Fig. 7 is a fragmentary view like Fig. 4 but illustrating a drop (which is shown in raised position in Fig. 4) in its lowered or closed position.

Like numerals designate corresponding parts throughout the several figures of the drawing.

The grating or grill is mounted upon a counter 5 and comprises a top rail 6 and bottom rails 7, said rails receiving the pintles 8 and 9 upon the upper and lower ends of the shutters 10 and by which pintles said shutters are mounted for rotation from the full line to the dotted line position illustrated in Fig. 2. Each shutter has an offset arm 11 rigidly secured thereto by a screw 12 and the outer ends of these arms are pivotally connected at 13 to a common actuating bar 14. A spring 15 bears between a bracket 16 and a pin 17, the latter being carried by the bar 14, and this spring tends to move the shutters 10 to closed position. However, movement of the actuating bar under the influence of the spring is prevented by a latch 18 which constitutes the core of a magnet 19 of a solenoid type. This magnet is included in an electrical circuit 20, having a source of current such as a battery 21 therein.

This circuit may extend to various points in the bank building in which the grill is located so that even if the cashier who is immediately confronted by a robber is unable to close the circuit any other employee of the bank not immediately menaced may come to his assistance by closing the circuit from a distant point and thus cause a bullet proof wall to snap into place in front of him. To this end a plurality of push buttons 22 are included in the circuit which push buttons may be located at various strategic points about the building. I additionally included in the circuit an alarm bell 23 which may be located at any desired place either inside or outside of the bank as hereinbefore set forth.

I further provide an independent circuit having a battery 24 and a spark coil 25 included therein. One end of this circuit is grounded and the other end is connected at 26 to a part of the grill and this circuit is energized whenever the switches 22 are closed, and preferably these switches 22 are of the lighting switch type which remain closed without being held.

Thus upon the closing of either of these switches the grill will snap to closed position to conceal the person therebehind from the view of the would-be robber, an alarm will be sounded to call help and a circuit will be completed which includes a spark coil and a source of power, one end of which circuit is grounded, as indicated at 27, and the other end of which is connected to the grill. Since these grills are usually mounted upon counters which are non-conductors, such as wood or marble, it follows that the only way in which the current can get back from the grill to the ground would be through the body of a person touching the grill in which event such person would receive a severe shock.

The shutters located at the windows 28 and 29 differ somewhat from the remaining shutters of the grill in that they are pivoted in the top rail 6 and in transverse rails 6ª disposed some distance above the lower ends of the shutters, and the lower portions of the shutters consist of movable sections 30 which are hingedly connected at 31 to the main portion 10ª of the shutters (see Fig. 5). A removable drop 32 is provided with a forwardly projecting lip 33 which is adapted to engage in notches 34 formed in the edges of the portions 30 of the shutters 10ª. When this lip is engaged in these notches the drop is held in the elevated position illustrated in Fig. 4 and persons having business with the teller located behind the window may pass objects to the teller or receive objects, such as money, bank-books or the like, from the teller through the space beneath said drop. However if, upon an alarm being given latch 18 is released and the various shutters are rotated to bring them into edgewise alignment with each other the notches 34 will move out of supporting engagement with the lip 33 and the drop will fall and close the space at the bottom of the window or windows. If it be desired to pass bulky objects through the window the drop may be removed and the hinged sections 30 may be swung upwardly on their pivots 31 as indicated in dotted line in Fig. 4. The drop is provided with projections 35 upon its ends which travel in ways 36 of the rearward projections 37 of the standards 38 which constitute parts of the grill. However, these ways extend upwardly only a short distance and it requires only a slight vertical movement of the drop to free it of these ways when the hinged lower portions 30 are to be swung upwardly to the dotted line position in Fig. 4. A spring actuated bolt 40 may be provided to snap into locking engagement with the drop when the latter falls to its lowermost position to thereby hold the drop in such lowered position.

While I have stated that the controlling switches may be located at varying points throughout the bank it is particularly intended to locate one of said switches at a point accessible to the foot of the teller so that even if he is compelled to raise his hands he can, with his foot, release the detent and close the grill or grating.

In Fig. 3 is indicated a construction wherein the connection between the actuating bar 14 and shutter 10 consists of a resilient sheet metal arm 11ª. This construction may be employed in lieu of the arms 11 and will permit of one or two of the shutters remaining partly open, if a robber thrusts a gun barrel between them, without preventing the closing of the remaining shutters.

It is to be understood that the invention is not limited to the precise construction set forth but that it includes within its purview whatever changes fairly come within either the terms or the spirit of the appended claims.

Having described my invention, what I claim is:

1. A grill comprising a window consisting of a plurality of vertically pivoted shutters, the lower portions of said shutters being hinged to swing with respect to the upper portions thereof, to a position where the hinged portions will lie substantially at right angles to said upper portions.

2. A grill comprising a window consisting of a plurality of vertically pivoted shutters having notches in their rear edges a counter, and shutters having their lower ends spaced from said counter to form a wicket and a drop having a lip engageable in said notches and supported thereby as long as the shutters are in open position, said drop being of such amplitude as to close the wicket when the shutters are closed and the drop falls.

3. A grill comprising a window consisting of a plurality of vertically pivoted shutters which terminate short of the bottom of the window to leave a space therebeneath, a drop adapted to close said space when in lowered position and interengaging elements between the drop and the shutters for supporting the drop in elevated position as long as the shutters are open.

4. A structure as recited in claim 3 in combination with a lock for locking the drop in its lowered position.

5. In a device of the character described the combination with a plurality of vertical, pivoted shutters, of an actuating bar for said shutters, means for moving said bar and resilient arms connecting said shutters with said bar.

In testimony whereof I hereunto affix my signature.

CHARLES FRANKLIN TANNEHILL.